United States Patent
Jansz et al.

(10) Patent No.: US 8,060,650 B2
(45) Date of Patent: Nov. 15, 2011

(54) DIAGNOSING A PATH IN A STORAGE NETWORK

(75) Inventors: Peter Jansz, Auburn, CA (US); Rajiv Kumar Grover, Folsom, CA (US); Krishna Babu Puttagunta, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1090 days.

(21) Appl. No.: 10/974,459

(22) Filed: Oct. 27, 2004

(65) Prior Publication Data

US 2006/0107089 A1    May 18, 2006

(51) Int. Cl.
   *G06F 15/173* (2006.01)
(52) U.S. Cl. ........ 709/244; 709/223; 709/224; 709/227; 714/42; 714/43
(58) Field of Classification Search .................. 709/223, 709/224, 244, 227; 714/42, 43
   See application file for complete search history.

(56) References Cited

U.S. PATENT DOCUMENTS

| | | | |
|---|---|---|---|
| 5,915,112 A | | 6/1999 | Boutcher |
| 6,381,642 B1 * | | 4/2002 | O'Donnell et al. ........... 709/224 |
| 6,754,853 B1 * | | 6/2004 | DeKoning et al. ............. 714/42 |
| 7,093,011 B2 * | | 8/2006 | Hirata et al. .................. 709/223 |
| 7,165,152 B2 * | | 1/2007 | Blumenau et al. ............ 711/152 |
| 7,324,455 B2 * | | 1/2008 | Dugan et al. .................. 370/248 |
| 2002/0143942 A1 * | | 10/2002 | Li et al. ......................... 709/225 |
| 2003/0172331 A1 | | 9/2003 | Cherian et al. |
| 2003/0187987 A1 | | 10/2003 | Messick et al. |
| 2005/0030893 A1 * | | 2/2005 | Dropps et al. ................. 370/229 |
| 2005/0097357 A1 * | | 5/2005 | Smith ........................... 713/201 |
| 2005/0108187 A1 * | | 5/2005 | Fujibayashi ..................... 707/1 |
| 2005/0108444 A1 * | | 5/2005 | Flauaus et al. ................. 710/15 |
| 2005/0210137 A1 * | | 9/2005 | Taguchi ......................... 709/227 |

OTHER PUBLICATIONS

Hewlett-Packard Development Company, "HP Storage Works Command View XP Path Connectivity User Guide," Product Version: 1.8, 1st Edition Nov. 2003, 80 pages.

* cited by examiner

*Primary Examiner* — Yves Dalencourt
*Assistant Examiner* — Michael C Lai

(57) ABSTRACT

Described herein are exemplary storage network architectures and methods for diagnosing a path in a storage network. Devices and nodes in the storage network have ports. Port metrics for the ports may be ascertained and used to detect link problems in paths. In an exemplary described implementation, the following actions are effectuated in a storage network: ascertaining one or more port metrics for at least one device at a first time; ascertaining the one or more port metrics for the at least one device at a second time; analyzing the one or more port metrics from the first and second times; and determining if the analysis indicates a link problem in a path of the storage network.

49 Claims, 10 Drawing Sheets

700

US 8,060,650 B2

DIAGNOSING A PATH IN A STORAGE NETWORK

TECHNICAL FIELD

The described subject matter relates to electronic computing, and more particularly to systems and methods for diagnosing a path in a storage network.

BACKGROUND

Effective collection, management, and control of information have become a central component of modern business processes. To this end, many businesses, both large and small, now implement computer-based information management systems.

Data management is an important component of computer-based information management systems. Many users now implement storage networks to manage data operations in computer-based information management systems. Storage networks have evolved in computing power and complexity to provide highly reliable, managed storage solutions that may be distributed across a wide geographic area.

As the size and complexity of storage networks increase, it becomes desirable to provide management tools that enable an administrator or other personnel to manage the operations of the storage network. One aspect of managing a storage network includes the monitoring and diagnosis of the health of communication paths in the storage network.

SUMMARY

Described herein are exemplary storage network architectures and methods for diagnosing a path in a storage network. Devices and nodes in the storage network have ports. Port metrics for the ports may be ascertained and used to detect link problems in paths. In an exemplary described implementation, the following actions are effectuated in a storage network: ascertaining one or more port metrics for at least one device at a first time; ascertaining the one or more port metrics for the at least one device at a second time; analyzing the one or more port metrics from the first and second times; and determining if the analysis indicates a link problem in a path of the storage network.

DETAILED DESCRIPTION

Described herein are exemplary storage network architectures and methods for diagnosing a path in a storage network. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
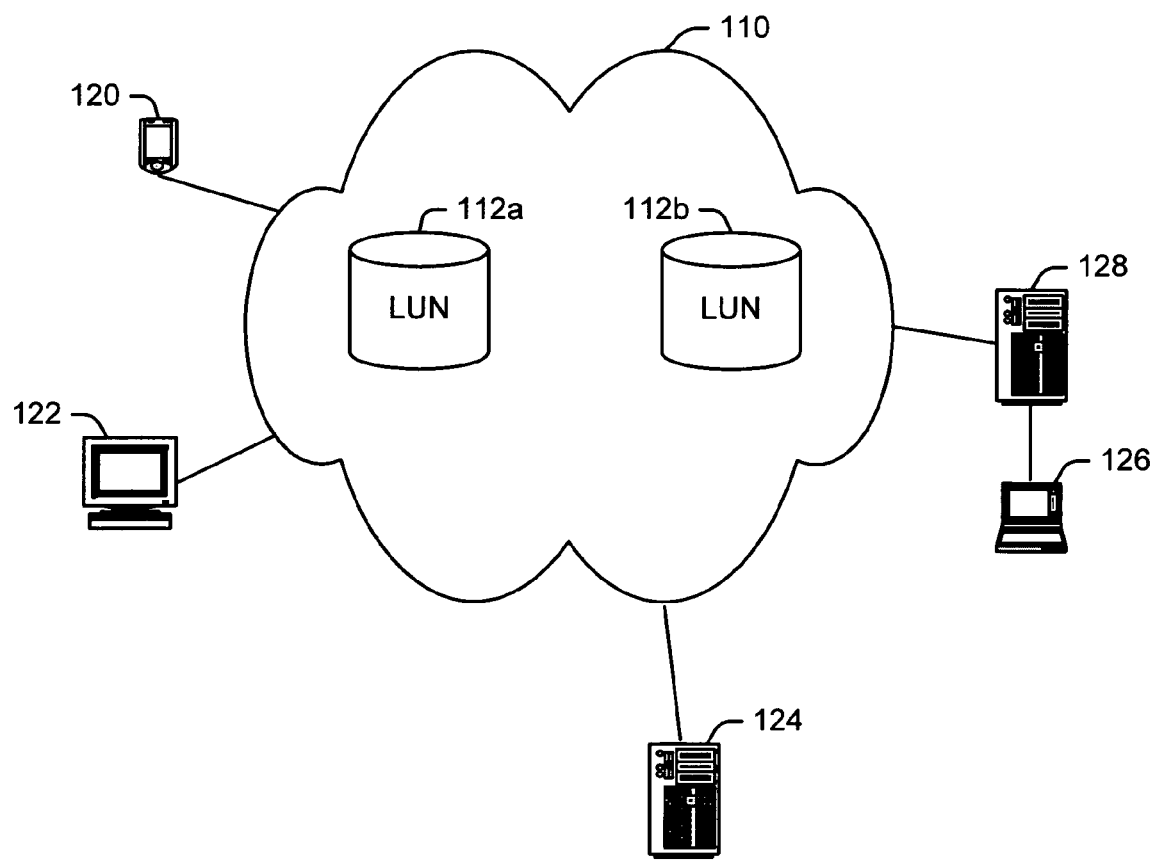
FIG. 1 is a schematic illustration of an exemplary implementation of a networked computing system that utilizes a storage network.

FIG. 1 is a schematic illustration of an exemplary implementation of a networked computing system 100 that utilizes a storage network. The storage network comprises a storage pool 110, which comprises an arbitrarily large quantity of storage space. In practice, a storage pool 110 has a finite size limit determined by the particular hardware used to implement the storage pool 110. However, there are few theoretical limits to the storage space available in a storage pool 110.

A plurality of logical disks (also called logical units or LUNs) 112a, 112b may be allocated within storage pool 110. Each LUN 112a, 112b comprises a contiguous range of logical addresses that can be addressed by host devices 120, 122, 124, and 128 by mapping requests from the connection protocol used by the host device to the uniquely identified LUN 112. As used herein, the term "host" comprises a computing system(s) that utilizes storage on its own behalf, or on the behalf of systems coupled to the host.

A host may be, for example, a supercomputer processing large databases or a transaction processing server maintaining transaction records. Alternatively, a host may be a file server on a local area network (LAN) or wide area network (WAN) that provides storage services for an enterprise. A file server may comprise one or more disk controllers and/or RAID controllers configured to manage multiple disk drives. A host connects to a storage network via a communication connection such as, e.g., a Fibre Channel (FC) connection.

A host such as server 128 may provide services to other computing or data processing systems or devices. For example, client computer 126 may access storage pool 110 via a host such as server 128. Server 128 may provide file services to client 126, and it may provide other services such as transaction processing services, email services, and so forth. Hence, client device 126 may or may not directly use the storage consumed by host 128.

Devices such as wireless device 120 and computers 122, 124, which are also hosts, may logically couple directly to LUNs 112a, 112b. Hosts 120-128 may couple to multiple LUNs 112a, 112b, and LUNs 112a, 112b may be shared among multiple hosts. Each of the devices shown in FIG. 1 may include memory, mass storage, and a degree of data processing capability sufficient to manage a network connection. Additional examples of the possible components of a computing device are described further below with reference to FIG. 4.

Figure 2:
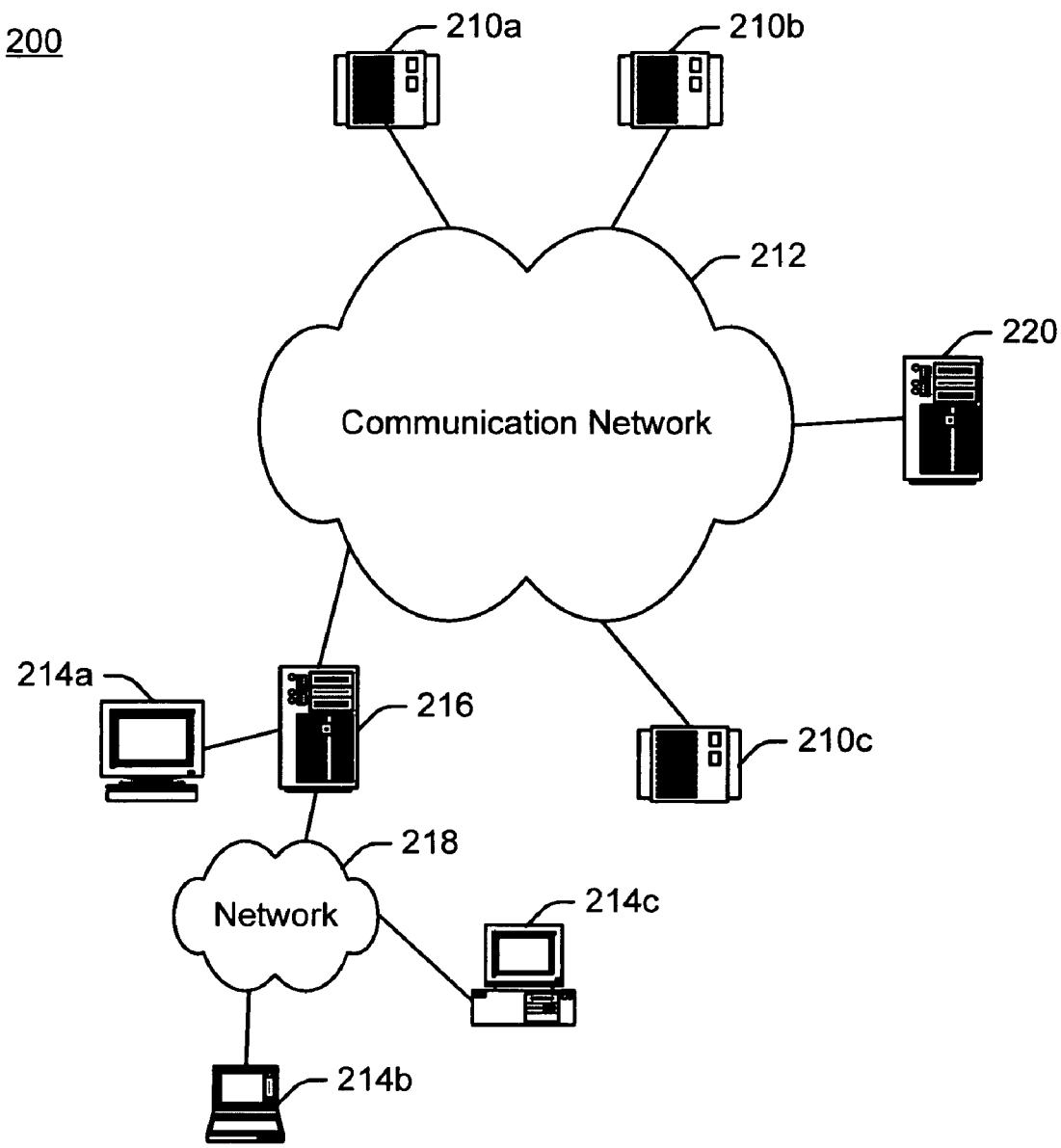
FIG. 2 is a schematic illustration of an exemplary implementation of a storage network.

FIG. 2 is a schematic illustration of an exemplary storage network 200 that may be used to implement a storage pool such as storage pool 110. Storage network 200 comprises a plurality of storage cells 210a, 210b, 210c connected by a communication network 212. Storage cells 210a, 210b, 210c may be implemented as one or more communicatively connected storage devices. An example of such storage devices is the STORAGEWORKS line of storage devices commercially available from Hewlett-Packard Corporation of Palo Alto, Calif., USA. Communication network 212 may be implemented as a private, dedicated network such as, e.g., a Fibre Channel (FC) switching fabric. Alternatively, portions of communication network 212 may be implemented using public communication networks pursuant to a suitable communication protocol such as, e.g., the Internet Small Computer Serial Interface (iSCSI) protocol.

Client computers 214a, 214b, 214c may access storage cells 210a, 210b, 210c through a host, such as servers 216, 220. Clients 214a, 214b, 214c may be connected to file server 216 directly, or via a network 218 such as a LAN or a WAN. The number of storage cells 210a, 210b, 210c that can be included in any storage network is limited primarily by the connectivity implemented in the communication network 212. By way of example, a FC switching fabric comprising a single FC switch can typically interconnect devices using 256 or more ports, providing a possibility of hundreds of storage cells 210a, 210b, 210c in a single storage network.

A storage area network (SAN) may be formed using any one or more of many present or future technologies. By way of example only, a SAN may be formed using FC technology. FC networks may be constructed using any one or more of multiple possible topologies, including a FC loop topology and a FC fabric topology. Networks constructed using a FC loop topology are essentially ring-like networks in which only one device can be communicating at any given time. They typically employ only a single switch.

Networks constructed using a FC fabric topology, on the other hand, enable concurrent transmission and receptions from multiple different devices on the network. Moreover, there are usually redundant paths between any two devices. FC fabric networks have multiple, and perhaps many, FC fabric switches. FC fabric switches are usually more intelligent as compared to switches used in FC loop networks. Examples of FC fabric topologies are the FC mesh topology, the FC cascade topology, and so forth.

The advantages of FC fabric networks are also accompanied by some disadvantages, such as greater cost and complexity. The multiple switches, the resulting enormous numbers of ports, the various paths, etc. enable the communication flexibility and network robustness described above, but they also contribute to the increased complexity of FC fabric networks. The diversity of available paths and the overall complexity of FC fabric networks create difficulties when attempting to manage such FC fabric networks. Schemes and techniques for diagnosing paths in storage networks can therefore facilitate an efficient management of such storage networks.

Figure 3:
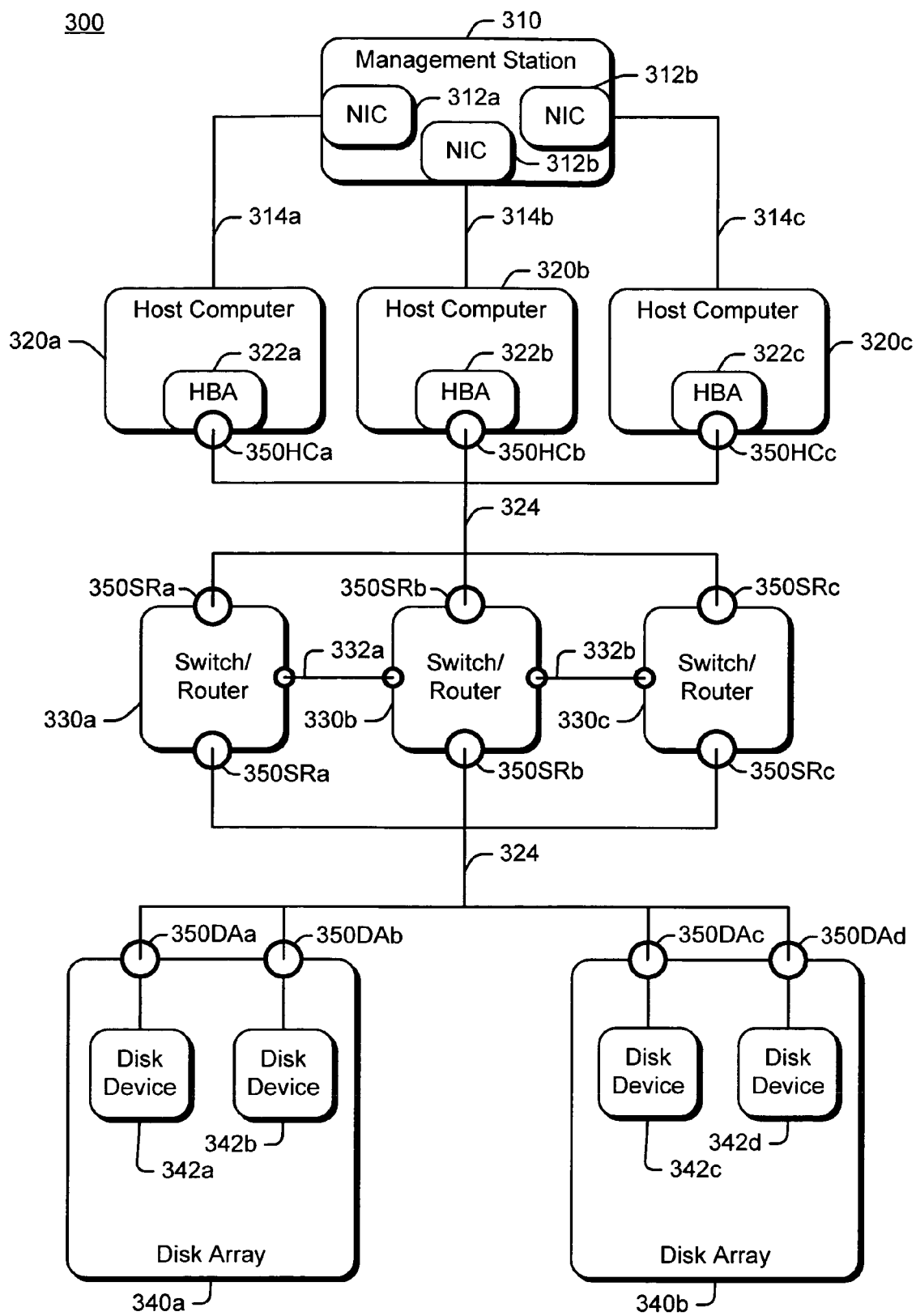
FIG. 3 is a schematic illustration of an exemplary implementation of a storage area network.

FIG. 3 is a block diagram illustrating an exemplary implementation of a SAN 300. Management station 310 controls the client side of SAN 300. As described in greater detail below, management station 310 executes software that controls the collection of both switch state and port metrics data, controls data collection functions, and manages disk arrays. In an exemplary implementation, SAN 300 comprises a Fibre Channel-based SAN, and the switch state and port metrics are consequentially related to Fibre Channel parameters. Management station 310 may be networked to one or more host computers 320a, 320b, 320c via suitable communication connections 314a, 314b, 314c. Management station 310 and host computers 320a, 320b, 320c may be embodied as, e.g., servers, or other computing devices.

In the specific example of FIG. 3, management station 310 is networked to three host computers 320a, 320b, 320c, e.g., via one or more network interface cards (NICs) 312a, 312b, 312c and respective communication links 314a, 314b, 314c. Each of host computers 320a, 320b, 320c may include a host bus adapter (HBA) 322a, 322b, 322c to establish a communication connection to one or more data storage devices such as, e.g., disk arrays 340a, 340b. Disk arrays 340a, 340b may include a plurality of disk devices 342a, 342b, 342c, 342d, such as, e.g., disk drives, optical drives, tape drives, and so forth.

The communication connection between host computers 320a, 320b, 320c and disk arrays 340a, 340b may be implemented via a switching fabric which may include a plurality of switching devices 330a, 330b, 330c. Switching devices 330a, 330b, 330c include multiple ports 350 as represented by ports 350SRa, 350SRb, 350SRc, respectively. Also shown are ports 350HCa, 350HCb, 350HCc for host computers 320a, 320b, 320c, respectively. Disk arrays 340a, 340b are shown with ports 350DAa/350DAb, 350DAc/350DAd, respectively. Although not so illustrated, each device (host, switch, disk, etc.) of SAN 300 may actually have dozens, hundreds, or even more ports. Additionally, although not separately numbered for the sake of clarity, switching devices 330 may have ports at communication links 332 inasmuch as a communication path from a host computer 320 to a disk array 340 may traverse multiple switching devices 330.

In an exemplary implementation, the switching fabric may be implemented as a Fibre Channel switching fabric. The Fibre Channel fabric may include one or more communication links 324 between host computers 320a, 320b, 320c and disk arrays 340a, 340b. Communication links 324 may be routed through one or more switching devices, such as switch/routers 330a, 330b, 330c.

The communication path between any given HBA 322 and a particular disk device 342 (or a logical disk device or LUN located on one or more disk devices 342) may extend through multiple switches. By way of example, a Fibre Channel path between HBA 322a and a particular disk device 342d may be routed through all three switches 330a, 330b and 330c in any order, e.g., via either or both of communication links 332a, 332b as well as communication links 324. The example communication path between HBA 322a and disk device 342d also includes any two or more of ports 350SR in the switching devices 330, as well as port 350HCa at the initiator and port 350DAd at the target.

Figure 4:
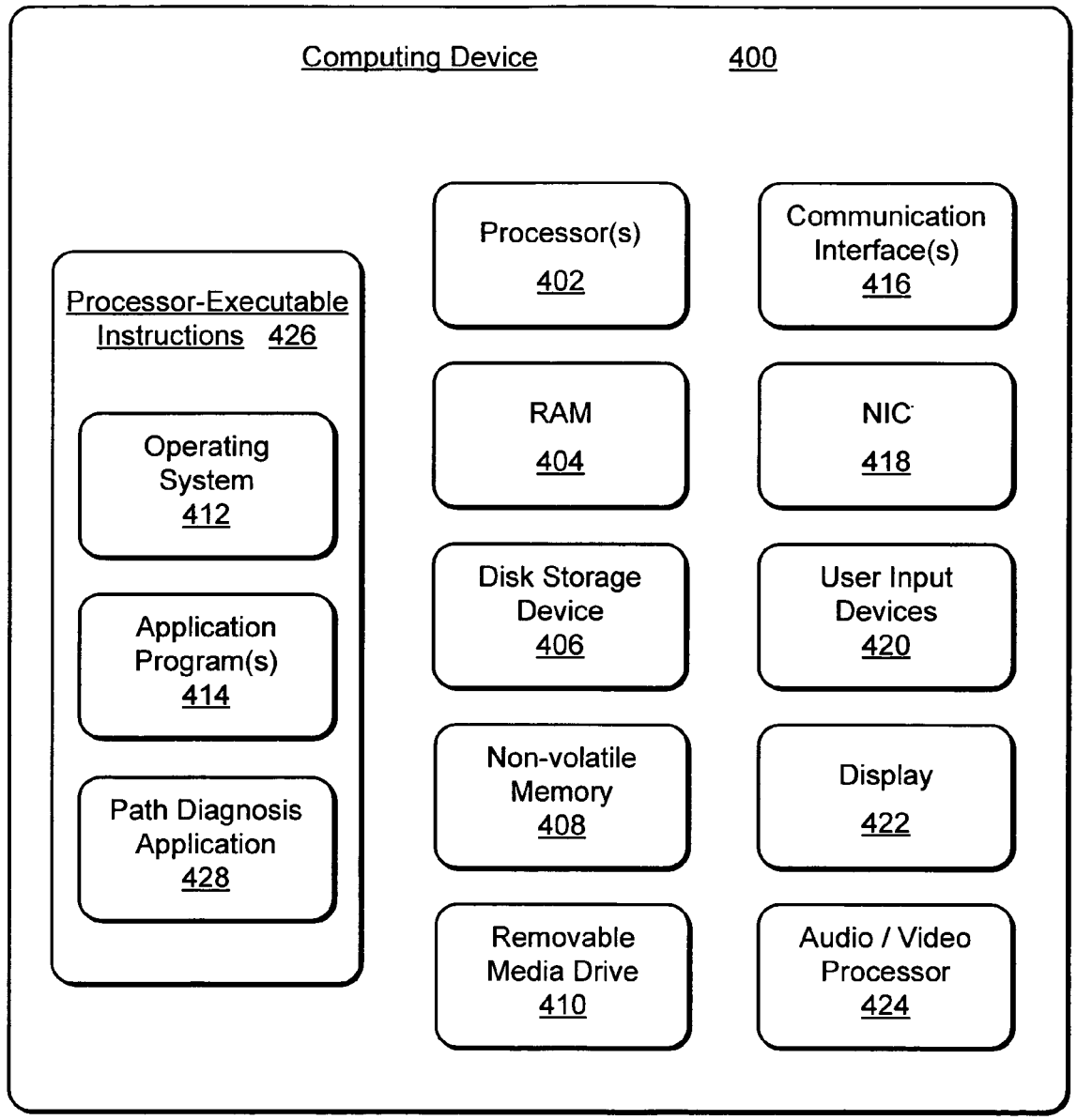
FIG. 4 is a schematic illustration of an exemplary computing device.

FIG. 4 is a schematic illustration of an exemplary computing device 400 that may be used, e.g., to implement management station 310 and/or host computers 320. The description of the basic electronic components of computing device 400 is also applicable to switches 330 and disk arrays 340, especially intelligent implementations thereof. Generally, various different general purpose or special purpose computing system configurations can be used to implement management station 310 and/or host computers 320.

Computing device 400 includes one or more processors 402 (e.g., any of microprocessors, controllers, etc.) which process various instructions to control the operation of computing device 400 and to communicate with other electronic and computing devices. Computing device 400 can be implemented with one or more media components. These media components may be transmission media (e.g., modulated data signals propagating as wired or wireless communications and/or their respective physical carriers) or storage media (e.g., volatile or nonvolatile memory).

Examples of storage media realizations that comprise memory are illustrated in computing device 400. Specifically, memory component examples include a random access memory (RAM) 404, a disk storage device 406, other nonvolatile memory 408 (e.g., any one or more of a read-only memory (ROM), flash memory, EPROM, EEPROM, etc.), and a removable media drive 410. Disk storage device 406 can include any type of magnetic or optical storage device, such as a hard disk drive, a magnetic tape, a recordable and/or rewriteable compact disc (CD), a DVD, DVD+RW, and the like.

The one or more memory components provide data storage mechanisms to store various programs, information, data structures, etc., such as processor-executable instructions 426. Generally, processor-executable instructions include routines, programs, protocols, objects, interfaces, components, data structures, etc. that perform and/or enable particular tasks and/or implement particular abstract data types. Especially but not exclusively in a distributed computing environment, processor-executable instructions may be located in separate storage media, executed by different processors and/or devices, and/or propagated over transmission media.

An operating system 412 and one or more general application program(s) 414 can be included as part of processor-executable instructions 426. A specific example of an application program is a path diagnosis application 428. Path diagnosis application 428, as part of processor-executable instructions 426, may be stored in storage media, transmitted over transmission media, and/or executed on processor(s) 402 by computing device 400.

Computing device 400 further includes one or more communication interfaces 416, such as a NIC or modem. A NIC 418 is specifically illustrated. Communication interfaces 416 can be implemented as any one or more of a serial and/or a parallel interface, as a wireless or wired interface, any type of network interface generally, and as any other type of communication interface. A network interface provides a connection between computing device 400 and a data communication network which allows other electronic and computing devices coupled to a common data communication network to communicate information to/from computing device 400 via the network.

Communication interfaces 416 may also be adapted to receive input from user input devices. Hence, computing device 400 may also optionally include user input devices 420, which can include a keyboard, a mouse, a pointing device, and/or other mechanisms to interact with and/or to input information to computing device 400. Additionally, computing device 400 may include an integrated display 422 and/or an audio/video (A/V) processor 424. A/V processor 424 generates display content for display on display device 422 and generates audio content for presentation by an aural presentation device.

Although shown separately, some of the components of computing device 400 may be implemented together in, e.g., an application specific integrated circuit (ASIC). Additionally, a system bus (not shown) typically connects the various components within computing device 400. Alternative implementations of computing device 400 can include a range of processing and memory capabilities, and may include any number of components differing from those illustrated in FIG. 4.

An administrator or other service personnel may manage the operations and configuration of SAN 300 using software, including path diagnosis application 428. Such software may execute fully or partially on management station 310 and/or host computers 320. In one aspect, an administrator or other network professional may need to diagnose the health of various communication links in the storage network using path diagnosis application 428. Path diagnosis application 428 may be realized as part of a larger, more encompassing SAN management application.

Figure 5:
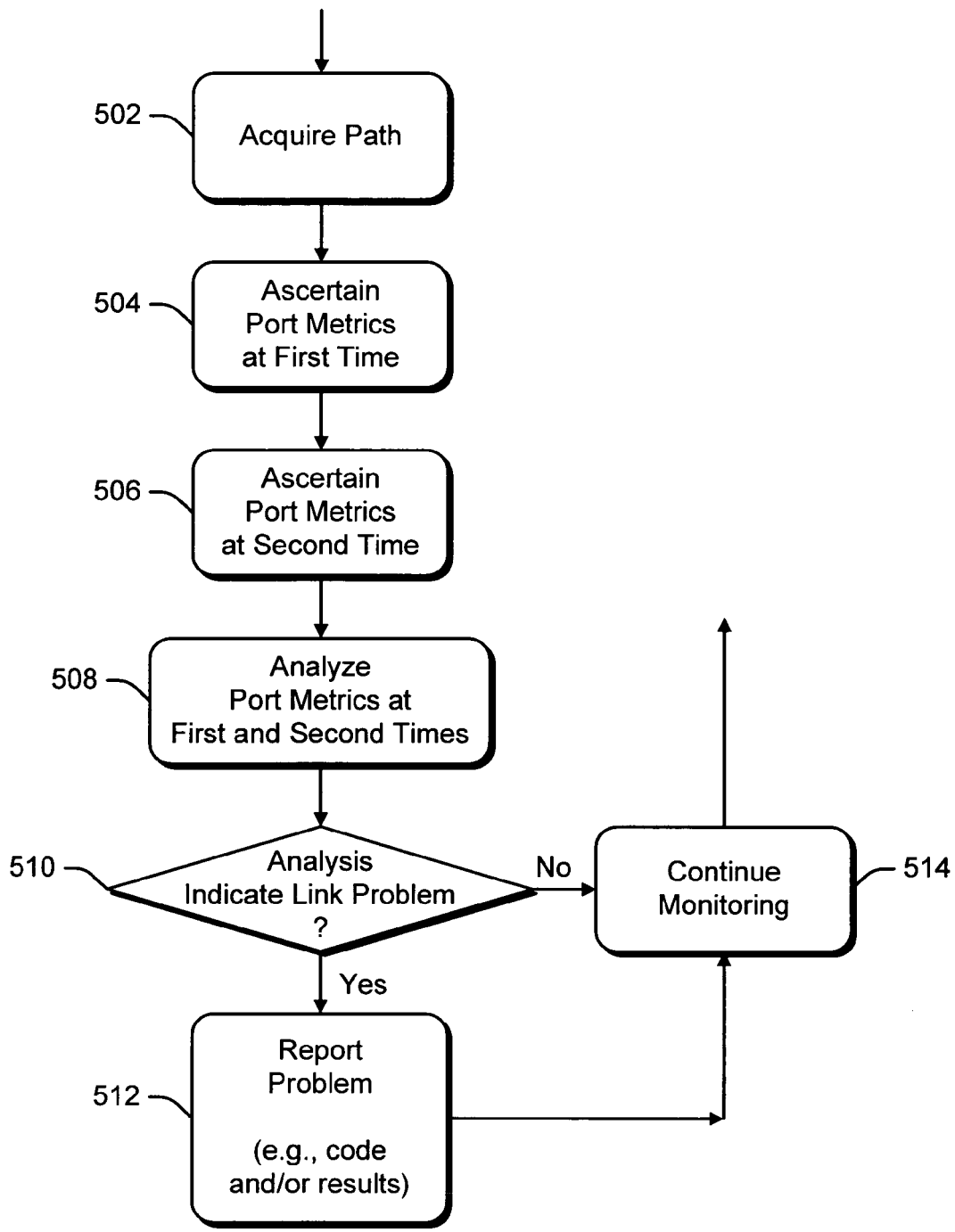
FIG. 5 is a flow diagram illustrating exemplary generic operations for diagnosing the health of a communication link in a storage network.

FIG. 5 is a flow diagram 500 illustrating exemplary generic operations for diagnosing the health of a communication link in a storage network. Flow diagram 500 includes seven (7) blocks 502-514. Although the actions of flow diagram 500 may be performed in other environments and with a variety of hardware and software combinations, FIGS. 1-4 are used in particular to illustrate certain aspects and examples of the method. For example, these actions may be effectuated by a path diagnosis application 428 that is resident on management station 310 and/or host computer 320 in SAN 300.

At block 502, a path is acquired. For example, one or more paths between host computers 320 and disk devices 342 may be acquired. The path includes multiple links and at least one switching device 330. For instance, a path from host computer 320a to disk device 342c through switching device 330b may be acquired.

At block 504, port metrics are ascertained at a first time. For example, metrics on ingress and egress ports 350SRb of switching device 330b may be ascertained. In certain implementations, the metrics of initiator port 350HCa and target port 350DAc may also be ascertained. Examples of such metrics are described further below with reference to FIGS. 6-7C. At block 506, the port metrics are ascertained at a second, subsequent time.

At block 508, the port metrics that were ascertained at the first and second times are analyzed. For example, the port metrics may be considered individually and/or by comparing respective port metrics ascertained at the first time to corresponding respective port metrics ascertained at the second time.

At block 510, it is determined if the analysis (of block 508) indicates that there is a link problem along the acquired path. For example, for some port metrics, a value of zero at either the first time or the second time might indicate a link problem. For other port metrics, a link problem is indicated if there is no change between the first and second times. For still other port metrics, a change that is too great (e.g., based on the time period between the two ascertainments) from the first time to the second time may indicate a link problem. Link problems that may be indicated from an analysis of the port metrics at the first and second ascertainment times are described further herein below with reference to FIGS. 6-7C.

If the analysis indicates that "NO" there are not any link problems, then at block 514 the monitoring is continued. If "Yes", on the other hand, a link problem is indicated by the analysis (as determined at block 510), then a problem is reported at block 512. For example, an error code and/or a results summary may be presented that identifies suspect ports 350SRb (ingress or egress), 350HCa, and/or 350DAc. Furthermore, the analyzed port metrics (or merely the specific ones indicating a problem) may be reported.

Additionally, the indicated port(s) 350, switching device(s) 330, host computer(s) 320, and/or disk device(s) 342 may be reported to an operator using path diagnosis application 428. In a described implementation, the result may be color coded depending on the severity of the indicated problem and/or graphically reported along with a pictorial representation of SAN 300.

Figure 6:
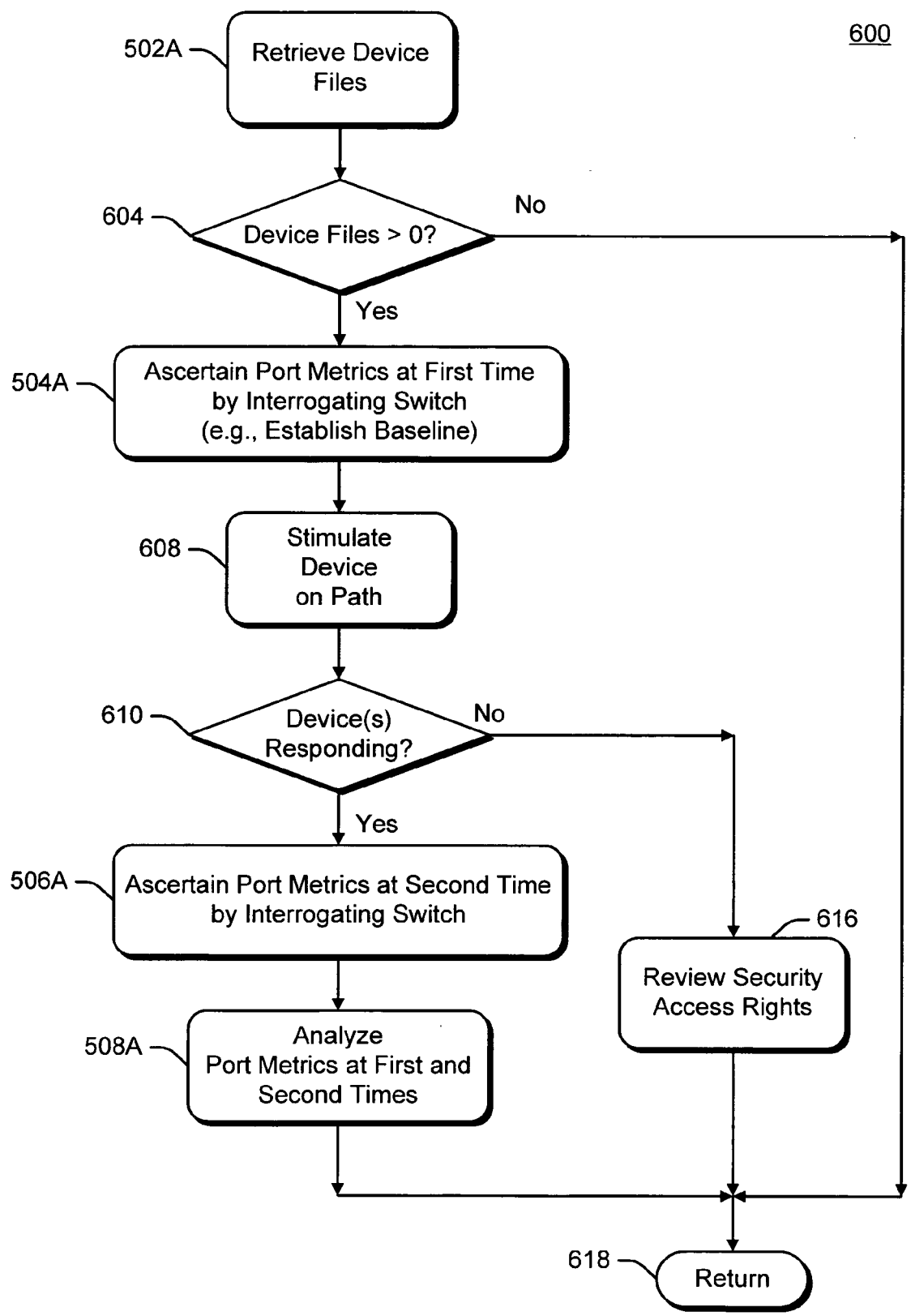
FIG. 6 is a flow diagram illustrating exemplary implementation-agnostic operations for diagnosing the health of a communication link in a storage network.

FIG. 6 is a flow diagram 600 illustrating exemplary implementation-agnostic operations for diagnosing the health of a communication link in a storage network. Flow diagram 600 includes nine (9) blocks. Although the actions of flow diagram 600 may be performed in other environments and with a variety of hardware and software combinations, FIGS. 1-4 and 5 are used in particular to illustrate certain aspects and examples of the method. For example, these actions may be effectuated by a path diagnosis application 428 that is resident on management station 310 and/or host computer 320 in SAN 300. Furthermore, blocks that are analogous to blocks of flow diagram 500 are similarly labeled (e.g., block 502A of flow diagram 600 is analogous to block 502 of flow diagram 500).

Thus, in an exemplary implementation, the operations of flow diagram 600 may be implemented as a software module of a storage network management system. The storage network management system may comprise a data collector module that collects data from the host computers, switches/routers, and disk arrays in the storage network. The system may further comprise one or more host agent modules, which are software modules that reside on the host computers and monitor the manner in which applications use the data stored in the disk arrays. The system may still further comprise a path connectivity module that executes on one or more host computers and monitors path connectivity.

In a described implementation, the path connectivity module (e.g., path diagnosis application 428) collects and displays information about the connectivity between the various host computers 320 and physical or logical storage devices 342 on disk arrays 340 in SAN 300. The information includes the IP address and/or DNS name of the host computer(s) 320 and the HBA's port 350HC World Wide Name (WWN).

The information may further include the switch port 350SR to which the HBA 322 is connected, the state of the switch port 350SR, the switch 330 IP address or DNS name, the switch port 350SR to which the disk array port 350DA is connected, and the status of that switch port 350SR. If the path includes two or more switches 330, then port information is collected for each switch 330 in the path. The information may further include the serial number of the disk array 340, the port 350DA on the disk array, and the WWN of the disk array port 350DA.

With reference to FIG. 6, the operations of flow diagram 600 may be implemented by a path diagnosis application 428 executing on a processor 402 of management station 310. In an exemplary implementation, path diagnosis application 428 may be invoked via a user interface, e.g., a graphical user interface (GUI). Path descriptors such as, e.g., the endpoints of a communication path may be passed to the software routine as parameters.

At block 502A, one or more device files corresponding to the communication path are retrieved. For example, one or more data tables that include information about the configuration of SAN 300 are obtained by path diagnosis application 428. This information includes path descriptors for the various (logical or physical) storage devices in SAN 300. The path descriptors include the communication endpoints (i.e., the HBA 322 initiator and the physical or logical storage devices 112, 210, 340, and/or 342 of the target) and port descriptors of the one or more switches 330 in the communication path between the HBA 322 and the storage device 340,342. Thus, in an exemplary implementation, the one or more device files corresponding to the communication path may be obtained from the data tables by scanning the data tables for entries that match the path descriptor(s) for the path that is being evaluated.

If, at block 604, no device files are found, then the path cannot be evaluated and control passes to block 618, where control returns to the calling routine. Optionally, an error signal indicating that the path cannot be evaluated may be generated. In response to the error signal, the GUI may generate and display a message to the user indicating that the selected path cannot be evaluated.

On the other hand, if at block 604 one or more device files are found, then at block 504A port metrics at a first time are ascertained by interrogating a switch in the path to, e.g., establish baseline switch port metrics. Continuing with the specific path example described above with reference to FIG. 5, baseline metrics for switch port(s) 350SRb may be ascertained with path diagnosis application 428 interrogating switch 330b.

In an exemplary implementation, each switch in the path descriptor is interrogated by performing a simple network management protocol (SNMP) query thereon. In response to an SNMP query, a switch returns a collection of port metrics for the switch ports thereof that are in the communication path. Examples of such port metrics include, but are not limited to, a transmission word count, a received word count, a number of cyclical redundancy cycle (CRC) errors, a number of invalid transmission words, a number of link failures, a number of primitive sequence protocol errors, a number of signal losses, a number of synchronization losses, and so forth. The received port metrics may be stored in a suitable data structure (e.g., a data table) in RAM 404 and/or nonvolatile memory 408 of management station 310.

At block 608, one or more devices associated with the selected path are stimulated. The devices may be a physical storage device (e.g., a specific disk or disks 342, 210) or a logical device (e.g., a LUN 112). For example, disk device 342c may be accessed so that traffic flows through ports 350SRb of switching device 330b. In an exemplary implementation, a SCSI inquiry is performed so as to stimulate device(s) on the selected path.

If, at block 610, none of the devices stimulated at block 608 respond, then control passes to block 616. Optionally, an error message indicting that none of the stimulated devices responded may be generated. In response to the error message, the GUI may generate and display a message to the user indicating that the selected path cannot be evaluated.

At block 616, security access rights may be reviewed. It is possible that a stimulated (e.g., by SCSI inquiry) device is not responding due to security reasons. For example, host computer 320a and/or the HBA 322a thereof may have insufficient security rights to access the device that was intended to be stimulated. For instance, the HBA port 322a may not be a member of the disk array port security access control list (ACL). If security is lacking, then it might be possible to increase or otherwise change the security access level so that the device can be stimulated. If so, then the action(s) of block 608 can be repeated; otherwise, control returns to the calling routine at block 618.

On the other hand, if one or more of the devices respond to the stimulation, then at block 506A the port metrics at a second time are ascertained by interrogating the one or more switches in the path. For example, at a second subsequent time, metrics for ports 350SRb may be ascertained. As described above for an exemplary implementation, these metrics may be ascertained by performing a second SNMP query on each switch in the path descriptor. In response to an SNMP query, the switch returns an updated collection of port metrics for its switch ports that are in the communication path.

At block 508A, the switch port metrics from the first and second times are evaluated. For example, the evaluation of the switch port metrics may involve comparing the metrics returned from the second interrogation with the metrics returned from the first interrogation. Based on the results of this evaluation, a signal indicating the health of the path is generated. Examples of health indicators include good (e.g., a green GUI indication), failing (e.g., a yellow GUI indication), and failed (e.g., a red GUI indication).

In an exemplary implementation, if the metrics returned from the second switch interrogation reflect an increase in the number of CRC errors, invalid transmission words, link failures, primitive sequence protocol errors, signal losses, or synchronization losses, then a signal is generated indicating a potential problem with the path. By contrast, if there is no increase in these parameters, then a signal may be generated indicating that the path is in good health.

Generally, if the difference between transmitted and/or received packets for a port between the first and second times is zero, then the port may be deemed suspicious. Furthermore, if a CRC or other SNMP error counter has a nonzero value for the interval between the first and second times for a given port, then that given port may be flagged as suspicious. As is described further herein below, the amount and/or rate of increase of the metrics may be considered when determining a health level of the path or any links thereof.

The following code is JAVA code illustrating an exemplary process for evaluating switch port metrics at a first point in time with switch port metrics at a second point in time. The first argument in each delta function represents the switch port metrics at the first point in time, and the second argument represents the switch port metrics at a second point in time.

```
StringBuffer sb = new StringBuffer( );
    long dPrw = delta(getPortReceivedWords(index),
rhs.getPortReceivedWords(index));
        if(dPrw == 0)
            sb.append("No change in received packets.\n");
        long dPtw = delta(getPortTransmittedWords(index),
rhs.getPortTransmittedWords(index));
        if(dPtw == 0)
            sb.append("No change in transmitted packets.\n");
        long dPce = delta(getPortCrcErrors(index),
            rhs.getPortCrcErrors(index));
        long dPitw = delta(getPortInvalidTransmissionWords(index),
rhs.getPortInvalidTransmissionWords(index));
        long dPlf = delta(getPortLinkFailures(index),
rhs.getPortLinkFailures(index));
        long dPpspe =
delta(getPortPrimitiveSequenceProtocolErrors(index),
rhs.getPortPrimitiveSequenceProtocolErrors(index));
        long dPsignl = delta(getPortSignalLosses(index),
rhs.getPortSignalLosses(index));
        long dPsyncl = delta(getPortSynchronizationLosses(index),
rhs.getPortSynchronizationLosses(index));
        if (dPlf != 0 || dPce != 0 || dPitw != 0 || dPpspe !=
            0 || dPsignl != 0 ||
dPsyncl != 0)
        {
            sb.append("Marginal link behavior seen at FcSwitch " +
getHostAddress( ) + ", port index " + index);
            sb.append("\t" + "tx_words=" + dPtw);
            sb.append(", " + "rx_words=" + dPrw);
            sb.append(", " + "crc_errors=" + dPce);
            sb.append(", " + "invalid_tx_words=" + dPitw);
            sb.append(", " + "link_failures=" + dPlf);
            sb.append(", " + "primitive_seq_proto_errors=" +
                dPpspe);
            sb.append(", " + "signal_losses=" + dPsignl);
            sb.append(", " + "sync_losses=" + dPsyncl);
            throw new PathConnectivityException(sb.toString( ));
        }
```

After the action(s) of block 508A, at block 618 operational control is returned to the calling routine as described above. In an exemplary implementation, one or more signals that are generated as a result of the analysis/evaluation process are passed back to the calling routine. The calling routine may process the signals and generate one or more messages indicating the health of the communication path, possibly identifying one or more individual links thereof. This information may also be presented on the GUI.

FIGS. 7, 7A, 7B, and 7C are flow diagram portions illustrating exemplary implementation-specific operations for diagnosing the health of a communication link in a storage network. These described implementation-specific operations involve the use of commands and/or fields of registers that may not be present in every storage network. Examples of such command(s) and fields(s) are: a port state query (PSQ) command, a bad node field (BNF), a failed link field (FLF), and so forth.

Figure 7:
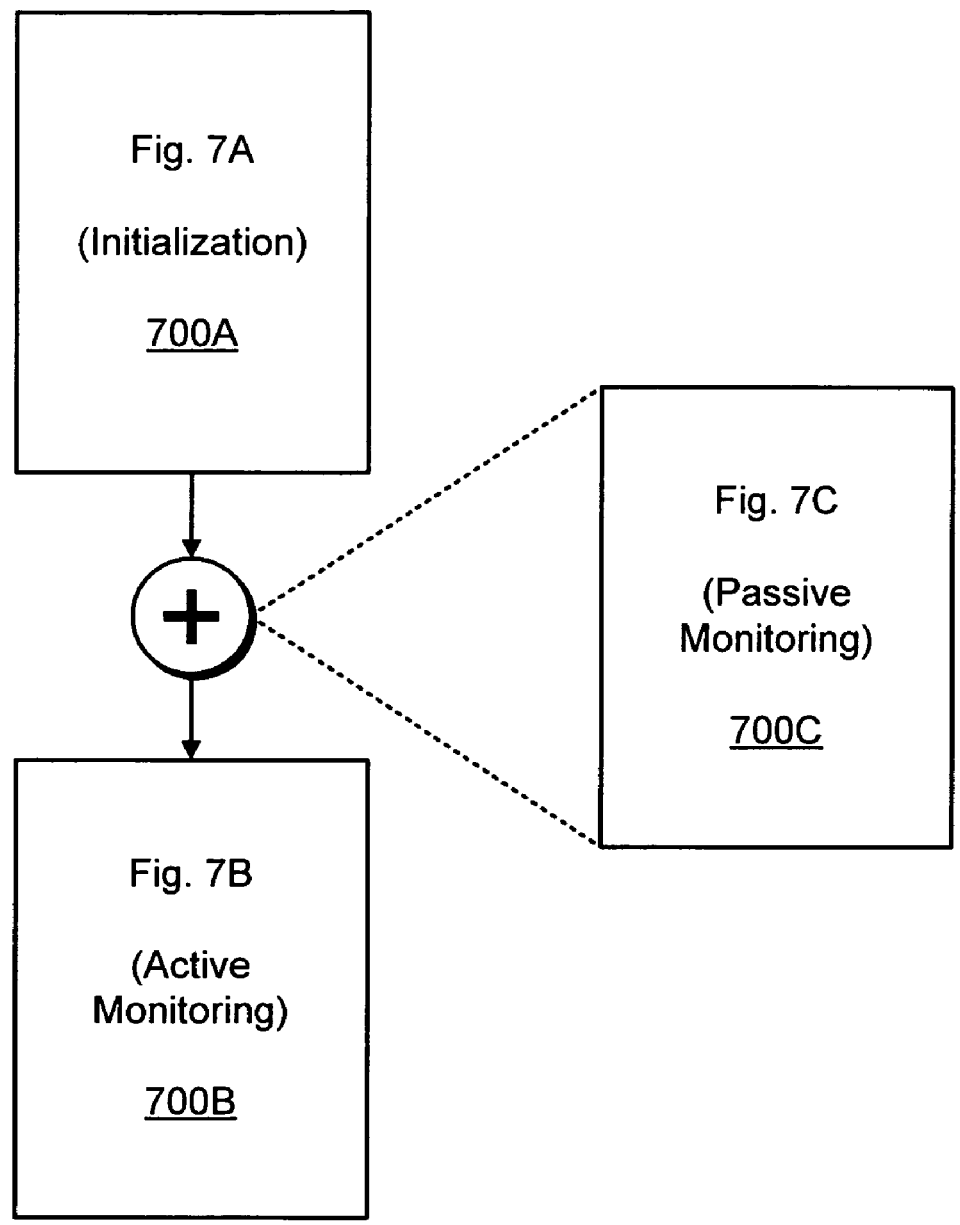
FIGS. 7, 7A, 7B, and 7C are flow diagram portions illustrating exemplary implementation-specific operations for diagnosing the health of a communication link in a storage network.
Figure 7A:
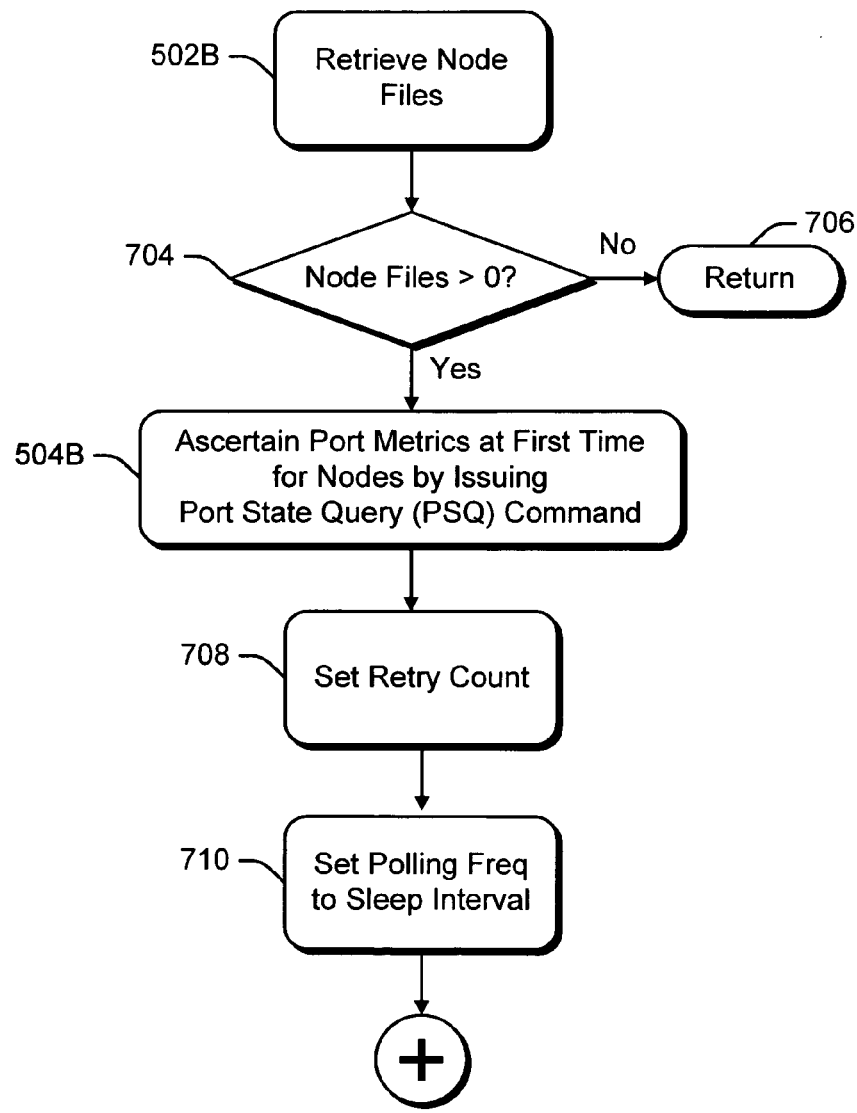
Figure 7B:
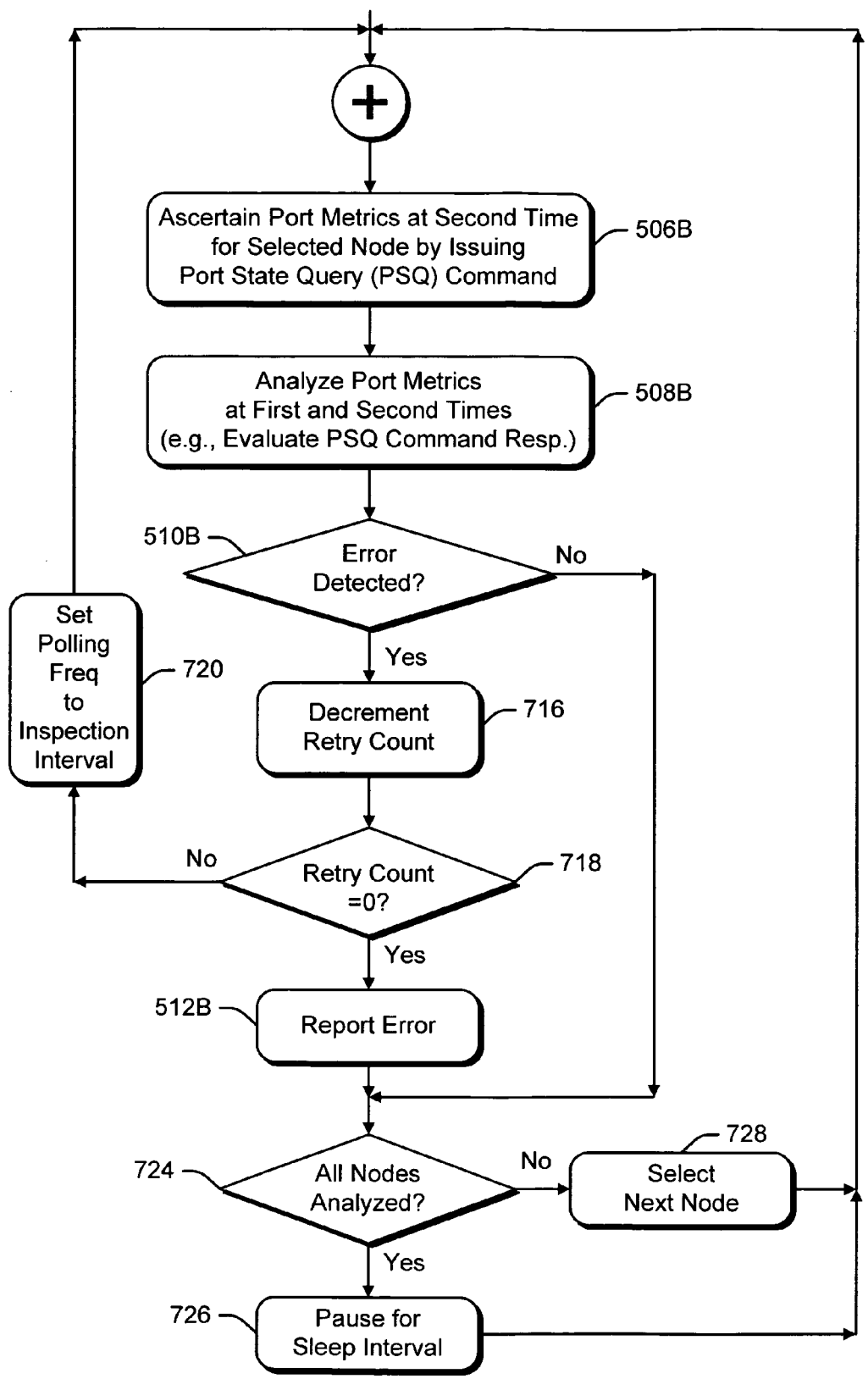
Figure 7C:
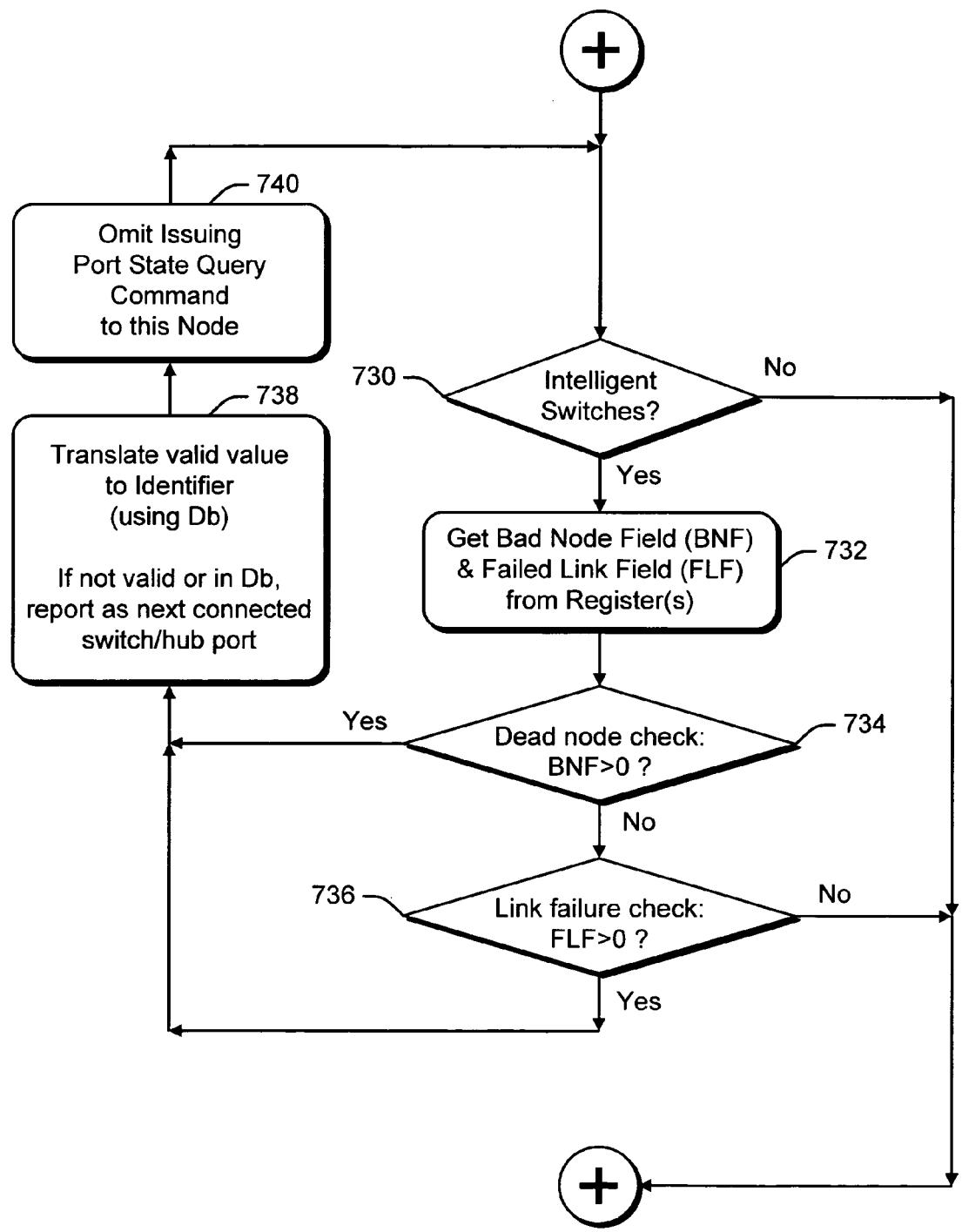

Flow diagram 700 of FIG. 7 includes three (3) blocks that illustrate an overall relationship of the flow diagrams of FIGS. 7A, 7B, and 7C. Flow diagrams 700A, 700B, and 700C of FIGS. 7A, 7B, and 7C (respectively) include six (6), ten (10), and six (6) blocks (respectively). Although the actions of flow diagrams 700A/B/C may be performed in other environments and with a variety of hardware and software combinations, FIGS. 1-4 and 5 are used in particular to illustrate certain aspects and examples of the method. For example, these actions may be effectuated by a path diagnosis application 428 that is resident on management station 310, host computer 320, and/or a disk array 340 in SAN 300. Furthermore, blocks that are analogous to blocks of flow diagram 500 are similarly labeled (e.g., block 502B of flow diagram 700A is analogous to block 502 of flow diagram 500).

In flow diagram 700 of FIG. 7, a block 700A represents the flow diagram of FIG. 7A, which illustrates an initialization phase for each monitoring period, iteration, path, or link. A block 700B represents the flow diagram of FIG. 7B, which illustrates an active monitoring portion of the described implementation-specific operations for diagnosing the health of a communication link in a storage network. A block 700C represents the flow diagram of FIG. 7C, which illustrates a passive monitoring portion of the implementation-specific operations.

In flow diagram 700A at block 502B, node files are retrieved. For example, for the nodes that are bound to SAN 300, optionally including the initiator and target ports, files may be retrieved for each such node. In an exemplary implementation, these files are retrieved from a database. The database is built prior to execution of the flow diagrams 700-700C.

Thus, as a preliminary step, a database is built by discovering and confirming SAN nodes. The database may then be maintained by path diagnosis application 428 (or another part of a SAN management application) with port information for each node in the SAN. The nodes in the SAN may be discovered through host scans and/or name service information from the switches. Discovered nodes may be confirmed by sending a port state query command to them. This can be used to collect initial port statistics of each port on the node in addition to confirming the node. The database may alternatively be built in other manners, including partially or fully manually.

Continuing with flow diagram 700A, it is checked at block 704 whether any node files were retrieved. If there are no nodes available, then no monitoring occurs (at least for this period, iteration, or path) and control is returned to a calling routine at block 706. On the other hand, if files for nodes are retrieved (at block 502B), then operations continue at block 504B.

At block 504B, port metrics at a first time are ascertained for one or more nodes by issuing a port state query (PSQ) command to the one or more nodes. For example, path diagnosis application 428, regardless of where it is resident, may issue a port state query command to HBA 322a, switching device 330b, and/or disk device 342c. In response, the queried nodes return switch port metrics in accordance with the implementation-specific protocol for a port state query command.

In an exemplary implementation, the health of communication links in a Fibre Channel storage network is diagnosed.

In such an exemplary FC-specific implementation, the described port state query (PSQ) command may be realized as a FC read link error status (RLS) command. Port state metrics that are relevant to link states include: bad character counts or loss of synchronization counts, loss of signal counts, link failure counts, invalid transmission word counts, invalid CRC counts, primitive sequence protocol error counts, and so forth.

At block 708, a retry count is set. An example value for the retry count is three. At block 710, a polling frequency is set to a sleep interval, which is user adjustable. An example value for the sleep interval is one to two hours. The uses and purposes of the retry count and the polling frequency are apparent from flow diagram 700B of FIG. 7B. As indicated by the encircled plus (+) sign, the operations of flow diagrams 700-700C proceed next to the passive monitoring illustrated in flow diagram 700C. However, this passive monitoring is described further herein below after the active monitoring portion of flow diagram 700B.

In flow diagram 700B of FIG. 7B, at 506B the port metrics at a second time for a selected node are ascertained by issuing a port state query command. For example, a port state query command may be sent to switching device 330b or HBA 322a or disk device 342c.

At block 508B, the port metrics ascertained at the first and second times are analyzed. A myriad of different analyses may be employed to detect problems. For example, a PSQ command response may be evaluated. Additionally, a link may be deemed deteriorating if a port metric increments by a predetermined amount within a predetermined time period. After some empirical investigation, it was determined that if a count increments by two or greater within two hours, the link can be deemed deteriorating. However, other values may be used instead, and alternative analyses may be employed.

If an error is not detected (from the analysis of block 508B), then flow diagram 700B continues at block 724. On the other hand, if an error is detected as determined at block 510B, the retry count is decremented at block 716.

If the retry count does not equal zero as determined at block 718, then the polling frequency is set to an inspection interval at block 720. The inspection interval is less than the sleep interval, and usually significantly less. An example value for the inspection interval is 10 seconds. Flow diagrams 700-700C then continue with an effectuation of the passive monitoring of flow diagram 700C, as indicated by the encircled plus. In this manner, the active monitoring of flow diagram 700B continues until the retry count expires to zero.

Thus, if the retry count is determined to equal zero (at block 718), an error is reported at block 512B. The error may be reported to the operator in any of the manners described above, including using a GUI with textual and/or color health indications.

It is determined at block 724 if all of the nodes of interest have been analyzed. If not, then the next node is selected at block 728, with flow diagrams 700-700C then continuing with the passive monitoring of FIG. 7C as indicated by the encircled plus. If, on the other hand, all nodes of interest have been analyzed, then the subroutine pauses for a duration of the polling frequency equal to the sleep interval at block 726.

Flowchart 700C of FIG. 7C illustrates the operations of the passive monitoring of a described implementation-specific diagnosing of the health of a communication link in a storage network. As described, the passive monitoring applies to intelligent switches (including hubs) that include one or more of a bad node field (BNF), a failed link field (FLF), and related processing logic and communication capabilities.

At block 730, it is determined if intelligent switches/hubs are present in the storage network being monitored. For example, it may be determined if switching (including hub) devices 330 are sufficiently intelligent so as to have a BNF and/or a FLF. If the switches of the network being monitored are not sufficiently intelligent, then the passive monitoring subroutine ends. On the other hand, if the switches/hubs are intelligent, then at block 732 the BNF and FLF values are acquired from one or more registers of a selected node being monitored.

At block 734, a dead node check is performed by checking if the BNF value is greater than zero. If so, there is a dead node, and the actions of block 738 are performed next. On the other hand, if there is no dead node (e.g., BNF=0), a link failure check is performed at block 736.

The link failure check is performed at block 736 by checking if the FLF value is greater than zero. If not and there is no failed link, then the static monitoring has not detected any problems and the passive monitoring subroutine ends. On the other hand, if a link failure is detected, then the actions of block 738 are performed.

At block 738, the value from the BNF or FLF that was greater than zero is translated into an identifier of the node or link, respectively, using the database that was discovered and confirmed in the preliminary stage (not explicitly illustrated). For example, the node (e.g., HBA 322a, switching device 330b, or disk device 342c) or communication link (e.g., links 324, and 332 when used) may be identified. If the value is not valid or is not in the database, then the next connected switch (e.g., switching device 330) or port (e.g., port 350SR) is reported as problematic.

At block 740, for a node that is identified as being problematic, issuance of a port state query command is omitted for the identified node. For example, if switching device 330b is identified, port state query commands are not sent thereto.

Fibre Channel storage networks are an example of a specific implementation in which passive monitoring as described herein may be effectuated. In an FC storage network, the BNF may comprise the "Bad alpa" field, the FLF may comprise the "Lipf" field, and the one or more registers may comprise the "Bad alpa" register. Thus, in an exemplary FC implementation, hardware assisted detection is used to detect a dead node with the "Bad alpa" register and a failed link in a private loop by deciphering the "lipf" value in the "Bad alpa" register. "Lipf" provides the alpa of the node downstream from the one that failed. The database is then used to decipher the problem node based on its identifier. If the value is undecipherable (e.g., it is either F7 or unknown), the connecting switch is identified as the problem. Once detected, an FC "RLS" is sent to the identified node after a tunable backoff time to recheck whether the node or link has recovered. It should be noted that this implementation-specific approach can be applied to switchless/hubless configurations in which spliced cables or similar are employed.

Although the implementation-agnostic (e.g., FIG. 6) and implementation-specific (e.g., FIGS. 7-7C) approaches are described somewhat separately (but in conjunction with the general approach of FIG. 5), they can be implemented together. Moreover, operations described in the context of one approach can also be used in the other. For example, the switch/hub interrogations of blocks 504A and 506A (of FIG. 6) may be used in the active monitoring of FIGS. 7-7C in lieu of or in addition to the port state query commands.

Path diagnosis application 428 can be deployed in multiple ways, three of which are specifically described as follows. First, an active monitoring deployment functions as a health check tool in the background. In this mode, the tool sweeps the monitored SAN (e.g., ascertains port metrics) at a regular frequency while the SAN is in operation. Second, the tool may be deployed in a troubleshooting mode when a problematic event occurs. A SAN sweep is effectuated at a higher frequency to generate/induce ELS link level traffic to consequently expose link level errors and thereby collect revealing port metric data. Third, the statistics collected using the first and/or the second deployment modes are charted to provide error patterning along with device/host logs to detect additional errors.

The devices, actions, aspects, features, procedures, components, etc. of FIGS. 1-7C are illustrated in diagrams that are divided into multiple blocks. However, the order, interconnections, interrelationships, layout, etc. in which FIGS. 1-7C are described and/or shown is not intended to be construed as a limitation, and any number of the blocks and/or other illustrated parts can be modified, combined, rearranged, augmented, omitted, etc. in any manner to implement one or more systems, methods, devices, procedures, media, apparatuses, arrangements, etc. for the diagnosing of a path in a storage network. Furthermore, although the description herein includes references to specific implementations (including the general device of FIG. 4 above), the illustrated and/or described implementations can be implemented in any suitable hardware, software, firmware, or combination thereof and using any suitable storage architecture(s), network topology(ies), port diagnosis parameter(s), software execution environment(s), storage management paradigm(s), and so forth.

In addition to the specific embodiments explicitly set forth herein, other aspects and embodiments of the present invention will be apparent to those skilled in the art from consideration of the specification disclosed herein. It is intended that the specification and illustrated embodiments be considered as examples only, with a true scope and spirit of the invention being indicated by the following claims.

What is claimed is:

1. A method, comprising:
   storing, in a memory communicatively coupled to a processor, computer executable instructions for performing a method of diagnosing a path including communication links between device ports in a storage network;
   executing the instructions on the processor;
   according to the instructions being executed performing a diagnostic routine, including:
   a) at a first time, interrogating a device port to ascertain one or more port metrics for the device;
   b) at a second time, interrogating the device port to ascertain the one or more port metrics for the device;
   c) analyzing the one or more port metrics ascertained at the first and second times; and
   d) determining whether the analysis indicates a storage network link problem:
      i) in response to no indicated problem, repeating b), c) and d) after a first interval;
      ii) in response to an indicated problem, repeating b), c) and d) after a second interval that is significantly shorter than said first interval, up to n times, wherein n equals a retry count;
      iii) when the analysis at any of the n times indicates no problem, repeating the diagnostic routine after successive first intervals; and
      iv) when the analysis at the nth time indicates a problem, reporting the problem.

2. The method as recited in claim 1, comprising:
   acquiring information regarding the path of the storage network; and
   wherein the one or more port metrics ascertained comprise a number of transmitted packets and a number of received packets, wherein analyzing comprises calculating a difference in the number of transmitted packets at the first time versus the second time and calculating a difference in the number of received packets at the first time versus the second time, and wherein determining comprises taking as an indication of a problem when the difference in the number of transmitted packets is zero or the difference in the number of received packets is zero, or a combination thereof.

3. The method as recited in claim 2, wherein acquiring comprises at least one of:
   retrieving one or more device files corresponding to the path of the storage network; or
   retrieving one or more node files of nodes that are bound to the storage network and that correspond to the path thereof.

4. The method as recited in claim 1, comprising reporting a problem relating to the path of the storage network when the analysis at d) iv) is determined to indicate a link problem in the path of the storage network.

5. The method as recited in claim 4, wherein reporting comprises at least one of:
   presenting an error code and/or a results summary that identifies suspect ports corresponding to the link problem along the path; or
   presenting at least those analyzed port metrics that indicate the link problem along the path.

6. The method as recited in claim 4, wherein reporting comprises at least one of:
   identifying a link having the link problem as failing or failed; or
   visually identifying a health of a link having the link problem by a color-coded graphical indicator.

7. The method as recited in claim 1, wherein:
   analyzing comprises comparing the one or more port metrics ascertained at the first time to the one or more port metrics ascertained at the second time; and
   determining comprises:
      taking as an indication of a problem when a difference between a number of transmitted packets for the device port or a difference between a number of received packets for the device port ascertained at the first time versus ascertained at the second time is zero;
      detecting if values of the one or more port metrics are increasing or unchanging based on the comparing; and
      detecting an indicated link problem dependent upon a type of the one or more port metrics.

8. The method as recited in claim 1, wherein:
   ascertaining one or more port metrics the first time comprises issuing a port state query command to the device port at the first time; and
   ascertaining the one or more port metrics the second time comprises issuing the port state query to the device port at the second time.

9. The method as recited in claim 8 wherein analyzing comprises evaluating responses to the port state query commands issued to the device port at the first and second times.

10. The method as recited in claim 8, wherein determining comprises detecting if the one or more port metrics increment or fail to increment by a predetermined amount between the first time and the second time.

11. The method as recited in claim 8, comprising:
   performing a dead node check with regard to a bad node field of an intelligent switch device; and performing a link failure check with regard to a failed link field of an intelligent switch device.

12. The method as recited in claim 11, wherein:

the storage network comprises a fibre channel storage area network (SAN); and the bad node field comprises a "lipf" field, and the failed link field comprises a "Bad alpas" field.

13. The method as recited in claim 11, comprising:

when a bad node or a failed link is detected from the checks,
(1) translating a value to an identifier of a switch device node, and
(2) reporting the identified node as problematic.

14. The method of claim 1, wherein the first interval is a sleep interval and the second interval is about 10 seconds.

15. The method of claim 14, wherein the sleep interval is at least one hour.

16. The method of claim 1, including after a) and before b), accessing the device port to stimulate the device;

determining if the device responds to the stimulating;

if the device does respond to the stimulating, proceeding with b), c), and d);

if the device does not respond to the stimulating, then reviewing security access rights to stimulate the device.

17. The method as recited in claim 16, wherein stimulating comprises performing a small computer serial interface (SCSI) inquiry on the device.

18. The method of claim 16, wherein stimulating comprises performing a small computer serial interface (SCSI) inquiry to stimulate the device.

19. The method of claim 1, wherein determining comprises determining that the analysis indicates a storage link problem because the ascertained port metrics did not change from the first time to the second time.

20. A management system for diagnosing paths in a storage network, the management system comprising:

a processor; and a non-transitory computer-readable medium that stores processor-executable instructions configured to direct the processor to:

a) interrogate a device port of a device at a selected first node of the network to ascertain one or more port metrics for the device at a first time;

b) interrogate the device port to ascertain the one or more port metrics for the device at a second time;

c) analyze the one or more port metrics ascertained at the first and second times;

d) determine whether the analysis indicates a storage network link problem and:

i) in response to no indicated problem, repeat a) b) c) and d) for a device port at a selected next node of the network;

ii) in response to an indicated problem, repeat b) c) and d) at the selected first node after an inspection interval, up to a plurality n times, wherein n=a retry count;

iii) in response to the analysis at any of the n times indicating no problem, repeat b), c) and d) for the device port at the selected next node of the network; and iv) report when the analysis at the nth time indicates a problem; and e) in response to completion of a), b), c), and d) for all of the selected nodes of the network, repeat a), b), c), and d) after a sleep interval that is significantly longer than said inspection interval.

21. The management system as recited in claim 20, wherein the processor-executable instructions are further configured to direct the processor to acquire information regarding the path of the storage network.

22. The management system as recited in claim 20, wherein the processor-executable instructions configured to direct the processor to report when the analysis at the nth time indicates a problem direct the processor to report an indication of a link problem in the path of the storage network when a number of transmitted packets at the device port ascertained the first time is the same as the number of transmitted packets at the device port ascertained the second time or when a number of received packets at the device port ascertained the first time is the same as the number of received packets at the device port ascertained the second time.

23. The management system as recited in claim 20, wherein the processor-executable instructions configured to direct the processor to interrogate the device port direct the processor to issue one or more port state query commands to the device port.

24. The management system as recited in claim 20, wherein the processor-executable instructions configured to direct the processor to interrogate the device port direct the processor to issue a port state query command to the device port to ascertain the one or more port metrics at the first time and issue a port state query command to the device port to ascertain the one or more port metrics at the second time.

25. The management system as recited in claim 24, wherein the processor-executable instructions configured to direct the processor to analyze the one or more port metrics ascertained at the first and second times direct the processor to evaluate one or more responses that are received from the device port and that correspond to the port state query commands issued to the device port at the first and second times.

26. The management system as recited in claim 25, wherein the processor-executable instructions configured to direct the processor to determine whether the analysis indicates a storage network link problem direct the processor to detect if the one or more port metrics, which are received in the one or more responses, increment or fail to increment by a predetermined amount within a predetermined period.

27. The management system as recited in claim 20, wherein the processor-executable instructions are further configured to direct the processor to:

perform a dead node check with regard to a bad node field of a switch device; and perform a link failure check with regard to a failed link field of a switch device.

28. The management system as recited in claim 20, comprising at least one of (i) one or more processor-accessible media or (ii) an apparatus of the storage network.

29. The management system of claim 20, wherein the sleep interval is at least one hour and the inspection interval is 10 seconds or less.

30. A system, comprising:

a computer configured to diagnose a health level of a path of a storage network that includes switchable communication links between at least one host, at least one storage device, and switching devices;

the computer is further configured to perform a diagnostic routine comprising:

a) interrogating a device port at a selected first node of the network path to ascertain one or more port metrics for the device at a first time;

b) interrogating the device port at the selected first node to ascertain the one or more port metrics for the device at a second time;

c) analyzing the one or more port metrics ascertained at the first and second times;
d) determining whether the analysis indicates a storage network path communication link problem:
  i) in response to an indicated problem, repeating b), c) and d) after an inspection interval, up to a plurality n times, wherein n equals a specified retry count;
  ii) when the analysis at d) or at any of the n times indicates no problem, repeating the diagnostic routine for a device port at a selected next node of the network path;
  iii) when the analysis at the nth time indicates a problem, reporting the problem; and
e) when a), b), c), and d) have been completed for all of the selected nodes of the network path, periodically repeating the diagnostic routine after respective sleep intervals each of which is significantly longer than said inspection interval; and
the computer is also configured to determine whether the storage network path includes an intelligent switch device and if so, perform at least one of a dead node check and a link failure check on the intelligent switch device, and if either check identifies a problem, omit interrogating the intelligent switch device.

31. The system as recited in claim 30, wherein:
the storage network includes at least three switching devices having a plurality of ports; and
the path includes the plurality of ports of the at least three switching devices.

32. The system as recited in claim 30, wherein the computer comprises a host computer having a host bus adapter (HBA) and/or a management station having a network interface card (NIC).

33. The system as recited in claim 30, wherein the computer is configured to stimulate the storage device between the first time and the second time.

34. The system as recited in claim 30, wherein the computer is configured to ascertain the one or more port metrics by issuing at least one port state query command to a switching device and/or to the storage device.

35. The system of claim 30, wherein the sleep intervals are at least one hour and the inspection interval is about 10 seconds.

36. One or more processor-accessible storage media comprising processor-executable instructions that, when executed, direct an apparatus to perform a diagnostic routine for diagnosing a path in a storage network including communication links between at least three switching devices and a storage device, the diagnostic routine comprising:
a) interrogating a device port at a selected first node of the network to ascertain one or more port metrics for the device at a first time;
b) interrogating the device port at the selected first node to ascertain the one or more port metrics for the device at a second time;
c) analyzing the one or more port metrics ascertained at the first and second times;
d) determining whether the analysis indicates a storage network communication link problem:
  i) in response to an indicated problem, repeating b), c) and d) after each of a succession of first intervals, up to a plurality n times, wherein n equals a retry count;
  ii) when the analysis at d) or at any of the n times indicates no problem, repeating the diagnostic routine for a device port at a selected next node of the network;
  iii) when the analysis at the nth time indicates a problem, reporting the problem; and
e) when a), b), c), and d) have been completed for all of the selected nodes of the network, repeating the diagnostic routine after successive second intervals each of which is significantly longer than said first interval.

37. The one or more processor-accessible storage media as recited in claim 36, wherein when there is no difference in a number of transmitted packets of the device port between ascertaining at the first time and ascertaining at the second time, or when there is no difference in a number of received packets for the device port between ascertaining at the first time and ascertaining at the second time, is taken as an indication of a problem.

38. The one or more processor-accessible storage media as recited in claim 36, wherein the one or more port metrics comprise at least one of a transmission word count, a received word count, a number of cyclical redundancy cycle (CRC) errors, a number of invalid transmission words, a number of link failures, a number of primitive sequence protocol errors, a number of signal losses, or a number of synchronization losses.

39. The one or more processor-accessible storage media as recited in claim 36, wherein at least a portion of the processor-executable instructions comprise at least part of a path connectivity module of a storage area network (SAN) management application.

40. The one or more processor-accessible storage media as recited in claim 36, wherein the ascertaining one or more port metrics for at least one device at a first time comprises issuing a port state query command to at least one node on the path of the storage network, the at least one node corresponding to the at least one device.

41. The one or more processor-accessible storage media as recited in claim 40, wherein the at least one node comprises a switch, a host bus adapter (HBA), or a disk device.

42. The one or more processor-accessible storage media as recited in claim 40, wherein the port state query command comprises a fibre channel read link error status (RLS) command.

43. The one or more processor-accessible storage media as recited in claim 40, wherein the one or more port metrics comprise bad character counts, loss of synchronization counts, loss of signal counts, link failure counts, invalid transmission word counts, invalid cyclical redundancy cycle (CRC) counts, or primitive sequence protocol error counts, or any combination thereof.

44. The one or more processor-accessible storage media of claim 36, wherein the first interval is a sleep interval and the second interval is an inspection interval comprising about 10 seconds.

45. The one or more processor-accessible storage media of claim 44, wherein the sleep interval is at least one hour.

46. The one or more processor-accessible storage media of claim 44, wherein n=3.

47. The one or more processor-accessible storage media of claim 36, wherein the diagnostic routine includes after a) and before b), accessing the device port to stimulate the device;
  determining if the device responds to the stimulating;
  if the device does respond to the stimulating, proceeding with b), c), and d);
  if the device does not respond to the stimulating, then reviewing security access rights to stimulate the device.

48. The one or more processor-accessible storage media of claim 47, wherein a small computer serial interface (SCSI) inquiry is performed to stimulate the device.

49. The one or more processor-accessible storage media of claim 47, wherein the diagnostic routine also includes determining if an intelligent switch device is present that has a BNF (bad node field) or a FLF (failed link field), determining if one of the BNF and FLF is greater than zero, and if greater than zero, identifying a node from the BNF or a link from the FLF, and if the identifying fails, then reporting a next-connected switch device or a next-connected port as problematic.

* * * * *

UNITED STATES PATENT AND TRADEMARK OFFICE
CERTIFICATE OF CORRECTION

| | | |
|---|---|---|
| PATENT NO. | : 8,060,650 B2 | Page 1 of 1 |
| APPLICATION NO. | : 10/974459 | |
| DATED | : November 15, 2011 | |
| INVENTOR(S) | : Peter Jansz et al. | |

It is certified that error appears in the above-identified patent and that said Letters Patent is hereby corrected as shown below:

In column 15, line 51, in Claim 20, delete "a) b) c)" and insert -- a), b), c), --, therefor.

In column 15, line 54, in Claim 20, delete "b) c)" and insert -- b), c) --, therefor.

Signed and Sealed this
Fourth Day of September, 2012

David J. Kappos
*Director of the United States Patent and Trademark Office*